United States Patent
Dubois

(10) Patent No.: US 11,401,378 B2
(45) Date of Patent: Aug. 2, 2022

(54) PROCESS FOR SYNTHESIZING POLYAMIDE PA 6-6

(71) Applicant: ARKEMA FRANCE, Colombes (FR)

(72) Inventor: Jean-Luc Dubois, Millery (FR)

(73) Assignee: ARKEMA FRANCE, Colombes (FR)

( * ) Notice: Subject to any disclaimer, the term of this patent is extended or adjusted under 35 U.S.C. 154(b) by 424 days.

(21) Appl. No.: 16/319,101

(22) PCT Filed: Jul. 25, 2017

(86) PCT No.: PCT/FR2017/052048
§ 371 (c)(1),
(2) Date: Jan. 18, 2019

(87) PCT Pub. No.: WO2018/020128
PCT Pub. Date: Feb. 1, 2018

(65) Prior Publication Data
US 2020/0399426 A1 Dec. 24, 2020

(30) Foreign Application Priority Data

Jul. 25, 2016 (FR) ...................................... 1670404

(51) Int. Cl.
| | |
|---|---|
| *C08G 69/28* | (2006.01) |
| *B60C 9/00* | (2006.01) |
| *C08G 69/26* | (2006.01) |
| *D01F 6/90* | (2006.01) |

(52) U.S. Cl.
CPC ............ *C08G 69/28* (2013.01); *B60C 9/0007* (2013.01); *C08G 69/265* (2013.01); *D01F 6/90* (2013.01)

(58) Field of Classification Search
CPC .......... C08L 77/06; C08G 69/28; C08G 69/26
See application file for complete search history.

(56) References Cited

U.S. PATENT DOCUMENTS

| | | | |
|---|---|---|---|
| 4,861,815 A | 8/1989 | Schultz et al. | |
| 2014/0349046 A1* | 11/2014 | Thieblemont | C08J 7/02 |
| | | | 428/35.5 |
| 2015/0336879 A1* | 11/2015 | Dubois | C07C 253/30 |
| | | | 560/155 |
| 2016/0075827 A1* | 3/2016 | Welch | C07C 55/14 |
| | | | 528/335 |

FOREIGN PATENT DOCUMENTS

JP 2006321826 A 11/2006

OTHER PUBLICATIONS

International Search Report (with English translation) and Written Opinion issued in corresponding International Patent Application No. PCT/FR2017/052048, dated Nov. 16, 2017, 10 pages.
Dipti, Dave, "PEP Review Jun. 2015, Polyamide (Nylon) 6 and 66 Process Summary," IHS Chemical, https://ihsmarkit.com/pdf/RW2015-06-toc_229422110917062932.pdf, PEP Review Process Economics Program Jun. 2015, Jul. 2015, p. 22.

* cited by examiner

*Primary Examiner* — Gregory Listvoyb
(74) *Attorney, Agent, or Firm* — Buchanan Ingersoll & Rooney P.C.

(57) ABSTRACT

A process for synthesizing polyamide PA 6-6, including a first step of reacting, in the presence of water, a compound of $R_0COO-(CH_2)_4-COOR'_0$ in which $R_0$ and $R'_0$, which may be identical or different, represent H or a linear or branched alkyl radical comprising from 1 to 4 carbon atoms, with hexamethylenediamine (HMDA), at a temperature of less than or equal to 160° C., to form a reaction medium, and then a second step of heating the reaction medium to a temperature of greater than or equal to 200° C.; the reaction medium also including a compound of $R_1-COO-(CH_2)_n-CH=CH-(CH_2)_n-COO-R_2$ and/or a compound of $R_3-(CH_2)_m-CH=CH-(CH_2)_n-COO-R_4$.

9 Claims, No Drawings

PROCESS FOR SYNTHESIZING POLYAMIDE PA 6-6

FIELD OF THE INVENTION

The present invention relates to a process for synthesizing polyamide PA 6-6 from adipic acid and hexamethylenediamine and also to the polyamide derived from this process.

TECHNICAL BACKGROUND

Polyamides are generally synthesized by polycondensation of a diamine with a diacid or by polycondensation of an amino acid.

PA 6-6 was the first polyamide synthesized, in 1935, and then industrialized by DuPont de Nemours in 1938. PA 6-6 or, according to its scientific name, poly(hexamethyleneadipamide), is often also known as Nylon® 6-6.

The synthesis of PA 6-6 using adipic acid and hexamethylenediamine (HMDA) as starting materials is described especially in "*Les Techniques de l'Ingénieur* J6 515—pages 1-7". The process consists, in a first phase known as the salification phase, in mixing adipic acid and hexamethylenediamine in aqueous solution while taking care, by adjusting the pH, to reach equimolecularity and to form "Nylon® 6-6 salt". In a second phase, the solution is concentrated to 77% by evaporation under a pressure of 0.3 bar. In a third stage, polycondensation is performed at 18 bar with a temperature increase to 250° C. accompanied by removal of the water of polycondensation. During the fourth step, the pressure is gradually lowered with removal of water and the temperature is increased to 270° C., and this temperature is maintained during the "cooking" leading to the final polymer.

However, the PA 6-6 prepared according to this process shows relatively pronounced water uptake (or absorption of humidity) (8.5%/24 hours, *PEP Review* 2015-06, *Polyamide (Nylon) 6 and 66 Process Summary*, page 22). Now, it is important for this water uptake to be as low as possible, especially to avoid its incidence on the dimensional stability of parts manufactured from this resin.

One subject of the present invention is thus to provide a process for preparing PA 6-6 which can overcome this obstacle.

SUMMARY OF THE INVENTION

The present invention arises from the unexpected demonstration, by the present inventors, that PA 6-6 synthesized in the presence of a mixture of an ester of monounsaturated fatty α,ω-diacid and of a nitrile of an ester of monounsaturated fatty acid shows reduced water uptake relative to that of PA 6-6 prepared without this mixture.

Thus, the invention relates to a process for synthesizing polyamide PA 6-6, comprising:
a first step of reacting, in the presence of water, a compound of formula (I):

$$R_0—OOC—(CH_2)_4—COO—R'_0 \quad (I)$$

in which $R_0$ and $R'_0$, which may be identical or different, represent H or a linear or branched alkyl radical comprising from 1 to 4 carbon atoms,
with hexamethylenediamine (HMDA), especially at a temperature below 160° C., to form a reaction medium, and then
a second step of heating the reaction medium to a temperature of greater than or equal to 200° C., the reaction medium also comprising:
a compound of formula (A):

$$R_1—OOC—(CH_2)_n—CH=CH—(CH_2)_n—COO—R_2 \quad (A)$$

and/or a compound of formula (B):

$$R_3—(CH_2)_m—CH=CH—(CH_2)_n—COO—R_4 \quad (B)$$

in which:
$R_1$, $R_2$ and $R_4$, which may be identical or different, represent H or a linear or branched alkyl radical comprising 1 to 4 carbon atoms,
$R_3$ represents —CN or —COOR$_5$, $R_5$ representing H or a linear or branched alkyl radical comprising from 1 to 4 carbon atoms,
m represents 0, 1 or 2 and n is an integer between 7 and 13, limits inclusive.

The present invention also relates to a polyamide PA 6-6 which may be obtained by performing the process as defined above.

The present invention also relates to a polyamide PA 6-6 comprising at least one residue chosen from the group constituted by the residues of formulae (A') and (B'):

$$—[CO—(CH_2)_n—CH=CH—(CH_2)_n—CO]— \quad (A'),$$

$$—[CO—(CH_2)_m—CH=CH—(CH_2)_n—CO]— \quad (B'),$$

in which m represents 0, 1 or 2 and n is an integer between 7 and 13, limits inclusive.

The present invention also relates to the use of a polyamide PA 6-6 as defined above, for the production of textile fibers, for the production of carpet fibers, for the production of tire cords or for the production of molded parts, such as tubes.

DETAILED DESCRIPTION OF THE INVENTION

Process

As will become clearly apparent to a person skilled in the art, the process of the invention especially envisages producing a polyamide PA 6-6 by reacting adipic acid with HMDA in the presence of water and of a mixture of difunctional monounsaturated fatty-chain compounds. Thus, the first step is a "salification" step corresponding especially to the synthesis of hexamethylenediamine adipate (or Nylon® 6-6 salt) with prior hydrolysis of any ester functions of the reagents. The second step is a step of polymerization by polycondensation of the monomers, diamines and diacids of the reaction medium. The compounds of formulae (A) and (B) can react with HDMA to form amide functions and thus become inscribed in the polymer during the polycondensation of the second step, or, as regards nitrile acids, i.e. when $R_3$=—CN, can constitute chain ends when —CN has not been totally hydrolyzed to give an acid function entering the polymerization chain.

When, simultaneously, compound of formula (A) and compound of formula (B) are included in the reaction medium, these compounds may be added to the reaction medium in the form of a mixture of a compound of formula (A) and of a compound of formula (B).

Moreover, the compound of formula (A) and/or the compound of formula (B) may be added to the reaction medium:
during the first step at the same time as the compound of formula (I) and HMDA and/or during the reaction between the compound of formula (I) and HDMA, and/or during the second step, at the start of the step and/or during the step.

The addition of the compound of formula (A) and/or of the compound of formula (B) during the first step is especially advantageous when the compounds of formulae (A) and (B) are in esterified form, the functions then being readily hydrolyzed to acid functions in the reaction mixture. The addition of the compound of formula (A) and/or of the compound of formula (B) during the second step is particularly advantageous when the compounds of formulae (A) and (B) are introduced in their acid forms, i.e. their non-esterified forms, which are directly reactive with HDMA.

Preferably, the compound of formula (I) is adipic acid, or a monoester or diester of this acid with a light alcohol, especially comprising from 1 to 4 carbon atoms, chosen in particular from the group constituted by methanol, ethanol, n-propanol, isopropanol, n-butanol, 2-butanol, isobutanol and tert-butanol, more particularly methanol.

Preferably, the compound of formula (A) is a symmetrical monounsaturated fatty diacid, a monoester or diester of said diacid with a light alcohol, especially comprising from 1 to 4 carbon atoms, chosen in particular from the group constituted by methanol, ethanol, n-propanol, isopropanol, n-butanol, 2-butanol, isobutanol and tert-butanol, more particularly methanol. Its fatty chain comprises 18 to 30, preferably 18 or 20 carbon atoms, more preferentially 18 carbon atoms.

Preferably, the compound of formula (B) is a nitrile/acid, nitrile/ester, diacid, acid/ester or ester/ester difunctional compound of a monounsaturated fatty chain comprising from 11 to 19 carbon atoms, more preferentially 11 or 12 carbon atoms. The ester forms result from reaction of the acid functions with a light alcohol, especially comprising from 1 to 4 carbon atoms, chosen in particular from the group constituted by methanol, ethanol, n-propanol, isopropanol, n-butanol, 2-butanol, isobutanol and tert-butanol, more particularly methanol.

Preferably, the compounds of formulae (I), (A) and (B) are introduced into the reaction medium in partially or totally esterified form.

Thus, it is preferred for $R_0$, $R'_0$, $R_1$, $R_2$ and $R_4$, which may be identical or different, to represent H or a —$CH_3$ group and for $R_3$ to represent —CN.

Similarly, it is preferred for m=0 and n=7.

Preferably, the mixture of the compound of formula (A) and of the compound of formula (B) comprises from 95 mol % to 99.9 mol % of the compound of formula (A) and from 0.1% to 5% of the compound of formula (B), more preferably from 98 mol % to 99.5 mol % of the compound of formula (A) and from 0.5 mol % to 2 mol % of the compound of formula (B).

Preferably also, the sum of the amounts of the compound of formula (A) and of the compound of formula (B) in the reaction medium represents from 0.1 mol % to 20 mol %, more preferably from 0.5 mol % to 20 mol % and even more preferably from 1 mol % to 3 mol %, of the compound of formula (I). In this context, as a person skilled in the art will clearly understand, when only one from among the compound of formula (A) and the compound of formula (B) is present in the reaction medium, the amount of the other is considered to be equal to 0%.

Preferably, the molar concentration of HMDA in the reaction medium is slightly higher than that of the compound of formula (I) such that the ratio of the number of amine functions/number of acid functions, namely -COOH, —COOR and —CN (—CN being counted as acidic due to its capacity to be hydrolyzed to acid), is between 0.97 and 1.03, more preferably between 0.99 and 1.01.

Preferably, the first step is performed in the presence of water, especially in the presence of an amount of water such that the mole ratio of the amount of water/sum of the amounts of compound of formula (I), of HMDA, of compound of formula (A) and of compound of formula (B) is between 1/15 and 15/1, more preferably between 1/10 and 10/1 and even more preferably between 1/2 and 2/1. The presence of water in excess is not prejudicial to the reaction performance. However, the duration and thus the cost of extraction of the water lead to reducing this amount as much as possible.

Preferably, the first step is performed at a temperature at a moderate temperature, i.e. between 80 and 160° C., more preferably between 100 and 130° C. Preferably, the second step is performed at high temperature, i.e. at a temperature between 200 and 300° C.

Preferably also, the temperature difference between the two steps is at least 50° C., more preferably at least 60° C., even more preferably at least 80° C. and particularly preferably at least 100° C.

Preferably, the first step is performed at a pressure of 1 to 3 bar, more preferentially from 1 to 2.1 bar.

Preferably, the first step also comprises extraction by distillation of the alcohols, and optionally of the ammonia, produced during this step. Preferably, the first step comprises extraction of at least 70, 80 or 90 mol % of the alcohols, and optionally of the ammonia, produced during this step. These alcohols originate especially from the hydrolysis of the ester functions. It is advantageous to remove these alcohols in order to avoid the formation of N-alkyl amines, which are detrimental to the properties of the polyamide PA 6-6 formed.

In one embodiment of the process according to the invention, the first step does not comprise heating. According to this embodiment, once the reaction medium has been constituted, the second step is engaged. This embodiment is especially advantageous when the compounds of formulae (I), (A) and (B) are introduced into the reaction medium in an acid form, i.e. a non-esterified form, i.e. when $R_0$, $R'_0$, $R_1$, $R_2$, $R_4$ and optionally $R_5$ represent H.

Preferably, the second step comprises the following substeps:
a) heating of the reaction medium obtained from the first step to a temperature of between 200 and 300° C., so that the temperature difference with the first step is at least 60° C., especially at least 80° C., at a pressure of between 7 and 40 bar with extraction of residual water by evaporation, and
b) reduction of the pressure to atmospheric pressure, especially sub-atmospheric pressure, at the same temperature, and
c) heating to a temperature from 270 to 280° C., especially to complete the polycondensation, generally under vacuum, especially to remove the final traces of water.

The process according to the invention may be performed discontinuously (in batch mode) in a single reaction assembly, or continuously, the steps or phases of the steps then being performed successively in specific reactors.

Preferably, the reaction medium comprises an ester hydrolysis catalyst. The ester hydrolysis catalyst may be added to the reaction medium at the start of the first step. The ester hydrolysis catalyst may especially be:
 a mineral base, such as an alkali metal or alkaline-earth metal hydroxide, especially NaOH, KOH, Ca(OH)$_2$ or Ba(OH)$_2$;
 a strong aprotic organic base, such as triazabicyclodecene, triazole, 1,8-diazabicyclo[5.4.0]undec-7-ene (DBU), 1,5-diazabicyclo[4.3.0]non-5-ene (DBN) or 1,4-diazabicyclo[2.2.2]octane (DABCO);

an amphoteric catalyst, such as zinc oxides or salts, in particular ZnO, alkoxides, sulfuric acid $H_2SO_4$, boron phosphate, phosphoric acid $H_3PO_4$, optionally supported, for example, on diatomaceous earth, aluminum phosphate or aluminosilicates, catalysts of phosphate or phosphoric type being preferred.

The catalyst is preferably used at a molar concentration of less than 1% relative to the HMDA.

Polyamide

Preferably, the polyamide PA 6-6 according to the invention, obtained especially via the process according to the invention, has a degree of water uptake of less than 8, 7, 6, 5, 4, 2 or 1% by mass.

As understood herein, the degree of water uptake is the ratio of the mass of a polyamide sample immersed in water, especially until an equilibrium is reached, from which is subtracted the mass of the dry sample, to the mass of the dry sample, multiplied by 100. Measurement of the amount of water absorbed may be performed by weighing, according to standard ASTM D 570-98, or by measuring the radioactivity of a sample immersed in tritiated water ($^3H_2O$), as is described especially in Valenzuela et al. (2011) *Journal of Applied Polymer Science* 121:1311-1320.

Preferably, the polyamide PA 6-6 according to the invention, obtained especially via the process according to the invention, has a relative viscosity of 30 to 80, more preferentially from 30 to 50.

As understood herein, the relative viscosity is the ratio of the time taken i) by a solution of polyamide at 8.4% by weight in a 90/10 formic acid/water solvent at 25° C. and ii) by the solvent, to pass through a capillary viscometer.

Preferably, the polyamide PA 6-6 according to the invention, obtained especially via the process according to the invention, has an average molecular weight of from 10 000 to 100 000 g/mol, preferentially from 14 000 to 50 000 g/mol.

Preferably, the polyamide PA 6-6 according to the invention, obtained especially via the process according to the invention, has a degree of N-alkylation of less than 1 mol %.

As understood herein, the degree of N-alkylation is calculated as the ratio of the N-methyl functions to the number of hexamethyleneadipamide units.

Preferably, the polyamide PA 6-6 according to the invention, obtained especially via the process according to the invention, comprises two or three different residues chosen from the group constituted by the residues of formulae (A') and (B').

As will be clearly apparent to a person skilled in the art, the term "residue" denotes a constituent monomer or comonomer of a polymer or of a copolymer in its form integrated into the polymer or the copolymer.

Preferably, the polyamide PA 6-6 according to the invention, obtained especially via the process according to the invention, comprises several residues of formulae —[CO—$(CH_2)_n$—CH=CH—$(CH_2)_n$—CO]— (A') and/or —[CO—$(CH_2)_m$—CH=CH—$(CH_2)_n$—CO]— (B').

Preferably, the polyamide PA 6-6 according to the invention, obtained especially via the process according to the invention, is such that m=0 and n=7.

Preferably, the polyamide PA 6-6 according to the invention, obtained especially via the process according to the invention, is such that the molar percentage of the amount of residues (A') and (B') relative to the amount of adipic acid and hexamethylenediamine residues is from 0.1 mol % to 20 mol %.

The invention will be further illustrated with the aid of the nonlimiting examples that follow.

EXAMPLES

Example 1

In a first step, an aqueous solution of hexamethylenediammonium adipate is prepared.

35.9 g of adipic acid, 30 g of hexamethylenediamine and 100 g of water are placed in a reactor. A mixture formed from 4.4 g of methyl 9-octadecenodioate (A) and 0.13 g of methyl 10-cyano-9-decenoate (NC—CH=CH—$(CH_2)_7$—$COOCH_3$) (B) was then added, this mixture having been obtained after a cross-metathesis reaction between methyl decenoate and acrylonitrile as described in patent application WO2014/122410. The reactor is then closed, purged with nitrogen and pressurized to 2.5 bar by heating to 135° C., and maintaining the pressure for 1 hour. The pressure is then gradually reduced until 35 g of condensates are collected. The mixture thus obtained has a concentration of about 52% by weight.

In a second step, polyamide 6-6 is prepared from the above aqueous solution of hexamethylenediammonium adipate salt at 52% by weight, which is placed in an evaporator. The mixture is heated to 153° C. under a pressure of 2.5 bar. At the end of evaporation of the water, the concentration of dissolved species in the water is 84% by weight. This solution is then transferred into an autoclave, which is then heated to obtain an autogenous pressure of 18 bar. The polymerization phase under pressure lasts for 60 minutes, and the pressure is then gradually reduced, to reach atmospheric pressure. During this decompression phase, the water produced during the polycondensation reaction is removed. The autoclave reactor is then maintained for 30 minutes at atmospheric pressure and 270° C. Finally, the reactor is placed under a nitrogen pressure of about 5 bar, so as to facilitate the extrusion of the polymer in the form of rods, which are cooled with water and chopped to obtain granules.

The water uptake capacity of the polymer is then measured according to the following "scintillation" method.

Tritiated water from Fisher-Scientific, at 1 mCi/ml, is used, which is diluted in HPLC-grade water to bring it to a concentration of 0.2 µCi/ml. 1 cm samples are placed in 10 ml bottles of tritiated water prepared beforehand, and stored at 40° C. After incubation for various times, the samples are removed, rinsed with HPLC-grade water and wiped. They are then dissolved in formic acid at 80% by weight and 12 ml of scintillation cocktail (Ecolite, available from Fisher Scientific). A calibration curve is constructed using increasing volumes of tritiated water diluted in the mixture of formic acid and scintillation liquid. Counting by liquid scintillation is performed using the calibration curve. The counting method is described in the literature, for example in *Les Techniques de l'Ingénieur*, document P2552. This method makes it possible to count the amount of water which has diffused into the sample. The water uptake is then calculated as being WU (%)=100×(mass of tritiated water)/(mass of the initial dry sample).

The degree of water uptake of the PA-6-6 of example 1 measured via the "scintillation" method is 6% for an immersion time of 100 hours.

Example 2 (Comparative)

Example 1 is repeated, but omitting the addition of the mixture of components (A) and (B), and using 38 g of adipic acid so as to have in the medium an amine function/acid function ratio of close to 1.

The degree of water uptake of the PA-6-6 of example 2 is 8% for an immersion time of 100 hours.

Comparison of Examples 1 (according to the invention) and 2 (comparative) shows that the PA 6-6 according to the invention has a lower degree of water uptake than a "standard" PA 6-6, and thus has increased dimensional stability.

Example 3

Synthesis of the PA 6-6 of example 1 is repeated, adding during the first step 0.24 g of phosphoric acid (as $H_3PO_4$ equivalent) at the same time as the adipic acid.

The degree of water uptake of the PA 6-6 is measured according to the second method known as the "weighing" method according to standard ASTM D 570-98.

According to this second method, the degree of water uptake is measured by placing samples of PA 6-6 dried beforehand at 37° C. in an oven in the presence of molecular sieves (desiccant). The samples are then immersed in a solution of 100 ml of saline solution at 0.150 M of NaCl. The samples are extracted regularly over a period of 100 days. After rinsing them with distilled water and wiping them on filter paper to remove the water adhering to the surface, they are weighed. They are then dried in an oven at 60° C. until their mass remains constant. The degree of water uptake at equilibrium is determined when the mass increase of several samples extracted successively becomes constant.

This weighing method is used in examples 4 to 6 below. The results obtained are collated in Table 1 below.

Example 4

The process is performed as in example 1, adding in the first step 0.20 g of zinc oxide at the same time as compounds (A) and (B), and 0.20 g of phosphoric acid just before starting the second step.

Example 5

The process is performed as in example 1, but with 35 g of adipic acid, a pressure of 3 bar and a temperature of 160° C. during the first step.

Example 6

The process is performed as in example 1, but with 2.0 g of methyl 9-octadecenedioate (A) and 0.02 g of methyl 10-cyano-9-decenoate (NC—CH=CH—(CH$_2$)$_7$—COOCH$_3$) (B).

The water uptake results according to the second method are collated in Table 1 below:

| Examples | Degree of water uptake at equilibrium |
|---|---|
| Example 3 | 6.3% |
| Example 4 | 6.2% |
| Example 5 | 6.4% |
| Example 6 | 7.4% |

It is observed that the degree of water uptake of the PA 6-6 of examples 3 to 6 according to the invention remain lower than the 8% degree of comparative example 2.

The invention claimed is:

1. A process for synthesizing polyamide PA 6-6, comprising:
    a first step of reacting, in the presence of water, a compound of formula (I):

$$R_0\text{—OOC—}(CH_2)_4\text{—COO—}R'_0 \quad (I)$$

in which $R_0$ and $R'_0$, which may be identical or different, represent H or a linear or branched alkyl radical comprising from 1 to 4 carbon atoms,
    with hexamethylenediamine (HMDA), to form a reaction medium, and then
    a second step of heating the reaction medium to a temperature of greater than or equal to 200° C.;
    the reaction medium also comprising:
    a compound of formula (A):

$$R_1\text{—OOC—}(CH_2)_n\text{—CH=CH—}(CH_2)_n\text{—COO—}R_2 \quad (A)$$

and/or a compound of formula (B):

$$R_3\text{—}(CH_2)_m\text{—CH=CH—}(CH_2)_n\text{—COO—}R_4 \quad (B)$$

in which:
    $R_1$, $R_2$ and $R_4$, which may be identical or different, represent H or a linear or branched alkyl radical comprising from 1 to 4 carbon atoms,
    $R_3$ represents —CN or —COO—$R_5$, $R_5$ representing H or a linear or branched alkyl radical comprising from 1 to 4 carbon atoms,
    m represents 0, 1 or 2 and n is an integer between 7 and 13, limits inclusive;
    in which the compound of formula (A) and the compound of formula (B) are added to the reaction medium in the form of a mixture of the compound of formula (A) and of the compound of formula (B) and the mixture of the compound of formula (A) and of the compound of formula (B) comprises from 95 mol % to 99.9 mol % of the compound of formula (A) and from 0.1% to 5% of the compound of formula (B).

2. The process as claimed in claim 1, in which $R_0$, $R'_0$, $R_1$, $R_2$ and $R_4$, which may be identical or different, represent H or a —CH$_3$ group and $R_3$ represents —CN.

3. The process as claimed in claim 1, in which m=0 and n=7.

4. The process as claimed in claim 1, in which the sum of the amounts of the compound of formula (A) and of the compound of formula (B) in the reaction medium represents from 0.1 mol % to 20 mol % of the sum of the amounts of HMDA and of the compound of formula (I).

5. The process as claimed in claim 1, in which the first step is performed in the presence of an amount of water such that the mole ratio of the amount of water/sum of the amounts of compound of formula (I), of HMDA, of compound of formula (A) and of compound of formula (B) is between 1/15 and 15/1.

6. The process as claimed in claim 1, in which the first step is performed at a temperature of between 80 and 160° C.

7. The process as claimed in claim 1, in which the second step is performed at a temperature of between 200 and 300° C.

8. The process as claimed in claim 1, wherein the first step of reacting is at a temperature of less than or equal to 160° C.

9. The process as claimed in claim 1, wherein the degree of water uptake of the PA 6-6 remains lower than 8%.

* * * * *